US012103555B2

United States Patent
Nasu et al.

(10) Patent No.: US 12,103,555 B2
(45) Date of Patent: Oct. 1, 2024

(54) VEHICLE MOTION CONTROL DEVICE AND VEHICLE MOTION CONTROL METHOD

(71) Applicant: Hitachi Astemo, Ltd., Hitachinaka (JP)

(72) Inventors: Shingo Nasu, Tokyo (JP); Kentarou Ueno, Hitachinaka (JP); Ryusuke Hirao, Hitachinaka (JP); Masaru Yamasaki, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/918,019

(22) PCT Filed: Apr. 12, 2021

(86) PCT No.: PCT/JP2021/015109
§ 371 (c)(1),
(2) Date: Oct. 10, 2022

(87) PCT Pub. No.: WO2021/210519
PCT Pub. Date: Oct. 21, 2021

(65) Prior Publication Data
US 2023/0137911 A1  May 4, 2023

(30) Foreign Application Priority Data
Apr. 14, 2020 (JP) .................... 2020-072161

(51) Int. Cl.
*B60W 60/00* (2020.01)
*B60W 40/072* (2012.01)

(52) U.S. Cl.
CPC ........ *B60W 60/001* (2020.02); *B60W 40/072* (2013.01); *B60W 2520/06* (2013.01)

(58) Field of Classification Search
CPC ............. B60W 60/001; B60W 40/072; B60W 2520/06; B60W 2552/30; B60W 2552/53;
(Continued)

(56) References Cited

U.S. PATENT DOCUMENTS

2008/0294321 A1* 11/2008 Yamakado ............ B60W 10/06
2012/0277965 A1* 11/2012 Takahashi ........... B60W 30/143
(Continued)

FOREIGN PATENT DOCUMENTS

JP  2011-207242 A  10/2011
JP  2017-100652 A  6/2017
(Continued)

OTHER PUBLICATIONS

Paul Alan Theodosis: "Path Planning for an Automated Vehicle Using Professional Racing Techniques", a Dissertation Submitted to the Department of Mechanical Engineering and the Committee on Graduate Studies of Stanford University, pp. 1-104, XP055760842, (Year: 2014).*
(Continued)

*Primary Examiner* — Elaine Gort
*Assistant Examiner* — Ellis B. Ramirez
(74) *Attorney, Agent, or Firm* — Volpe Koenig

(57) ABSTRACT

A vehicle motion control device generates a travel route where behavior of a vehicle traveling on a curve is small and comfortable ride is achieved even when the vehicle travels on a continuous curve. The control device includes a travel track generation unit that generates, based on information on a curvature of a first curve on a lane existing in a traveling direction of a vehicle and a curvature of a second curve connected to the first curve, a travel route by setting curvature of the travel route at a time of traveling on a curve having a smaller curvature between the first and second curves to be larger than the curvature of the curve and setting a curvature of the travel route at a time of traveling on a curve having a larger curvature between the first and second curves to be smaller than the curvature of the curve.

15 Claims, 9 Drawing Sheets

(58) Field of Classification Search
CPC ....... B60W 30/18145; B60W 30/0956; B60W 30/045; B60W 30/01
USPC ............ 701/23, 12, 65, 80; 382/316; 73/640
See application file for complete search history.

(56) References Cited

U.S. PATENT DOCUMENTS

| | | | |
|---|---|---|---|
| 2013/0274996 A1* | 10/2013 | Sekine | G06F 17/00 |
| | | | 701/36 |
| 2014/0032072 A1* | 1/2014 | Yoshihama | B60K 31/0075 |
| 2016/0375901 A1* | 12/2016 | Di Cairano | G01C 21/34 |
| 2017/0240205 A1 | 8/2017 | Nakada et al. | |
| 2018/0099667 A1* | 4/2018 | Abe | G08G 1/167 |
| 2018/0345967 A1* | 12/2018 | Oniwa | B60T 8/17 |
| 2019/0196487 A1* | 6/2019 | Akiyama | B62D 6/003 |
| 2019/0243370 A1* | 8/2019 | Li | G05D 1/0088 |
| 2019/0308621 A1 | 10/2019 | Inou et al. | |
| 2021/0197796 A1* | 7/2021 | Tezuka | B60W 30/143 |

FOREIGN PATENT DOCUMENTS

| | | |
|---|---|---|
| JP | 2017-146215 A | 8/2017 |
| JP | 2017-149184 A | 8/2017 |

OTHER PUBLICATIONS

International Search Report, PCT/JP2021/015109, Jun. 22, 2021, 2 pgs.

\* cited by examiner

VEHICLE MOTION CONTROL DEVICE AND VEHICLE MOTION CONTROL METHOD

TECHNICAL FIELD

The present invention relates to a vehicle motion control device and a vehicle motion control method that generate a travel track to be a travel target of a vehicle and control a motion of the vehicle based on the generated travel track.

BACKGROUND ART

As a vehicle motion control technique, it is known to generate a travel track including information such as a travel route and a travel speed that are to be travel targets of a vehicle, and control a powertrain, a brake, a steering, and the like such that the vehicle follows and travels along the generated travel track.

As the simplest travel route, there is a travel route in which the center of a lane is set to the travel route.

As a background technology in such a technical field, there is JP 2017-100652 A (PTL 1).

PTL 1 describes a travel track generating device that determines whether or not a curved track defined by a curvature radius exists in a route range set in advance in a traveling direction from a current position of a vehicle in a lane travel route indicating a center of a preset lane, and when it is determined that the curved track exists and a planned travel track on which the vehicle is planned to travel is to be generated, sets a track corresponding to the planned travel track, which is the curved track, as a cornering line, and generates the planned travel track such that the curvature radius of the cornering line is larger than the curvature radius of the curved track (see Abstract).

CITATION LIST

Patent Literature

PTL 1: JP 2017-100652 A

SUMMARY OF INVENTION

Technical Problem

The travel track generating device described in PTL 1 generates a planned travel track such that a curvature radius of a cornering line (a travel route at the time of traveling on a curve) is larger than a curvature radius of a curved route (road shape), and improves ride comfort of a vehicle.

However, since the travel track generating device described in PTL 1 always generates a planned travel track such that a curvature radius of a travel route at the time of traveling on a curve is larger than the curvature radius of the road shape, the start point and the end point of a planned travel track of one curve are located outside a lane travel route.

In particular, at a connection point of a continuous curve where the distance between a curve and a curve is limited, it is necessary to connect two points outside the lane travel route, and there is a possibility that the degree of freedom of a planned travel track that can be generated is reduced.

That is, the travel track generating device described in PTL 1 may be able to generate only a travel route having a curvature radius substantially the same as that in a case where the center of a lane is set as the travel route, and there is a possibility that necessary and sufficient ride comfort of the vehicle cannot be obtained.

Therefore, the present invention provides a vehicle motion control device and a vehicle motion control method that generate a travel route in which a behavior of a vehicle traveling (turning) on a curve is small and comfortable ride is achieved even when the vehicle travels on a continuous curve where the distance between a curve and a curve is limited.

Solution to Problem

In order to solve the above problems, a vehicle motion control device according to the present invention includes a travel track generation unit that generates, based on information of a curvature of a first curve on a lane existing in a traveling direction of a vehicle and a curvature of a second curve connected to the first curve, a travel route by setting a curvature of the travel route at a time of traveling on a curve having a smaller curvature between the first curve and the second curve to be larger than the curvature of the curve and setting a curvature of the travel route at a time of traveling on a curve having a larger curvature between the first curve and the second curve to be smaller than the curvature of the curve.

In order to solve the above problems, a vehicle motion control method according to the present invention includes causing a travel track generation unit to generate, based on information of a curvature of a first curve on a lane existing in a traveling direction of a vehicle and a curvature of a second curve connected to the first curve, a travel route by setting a curvature of the travel route at a time of traveling on a curve having a smaller curvature between the first curve and the second curve to be larger than the curvature of the curve and setting a curvature of the travel route at a time of traveling on a curve having a larger curvature between the first curve and the second curve to be smaller than the curvature of the curve.

Advantageous Effects of Invention

According to the present invention, it is possible to provide a vehicle motion control device and a vehicle motion control method that generate a travel route in which a behavior of a vehicle traveling (turning) on a curve is small and comfortable ride is achieved even when the vehicle travels on a continuous curve where the distance between a curve and a curve is limited.

Problems, configurations, and effects other than those described above will be clarified from the following description of examples.

DESCRIPTION OF EMBODIMENTS

Figure 1:
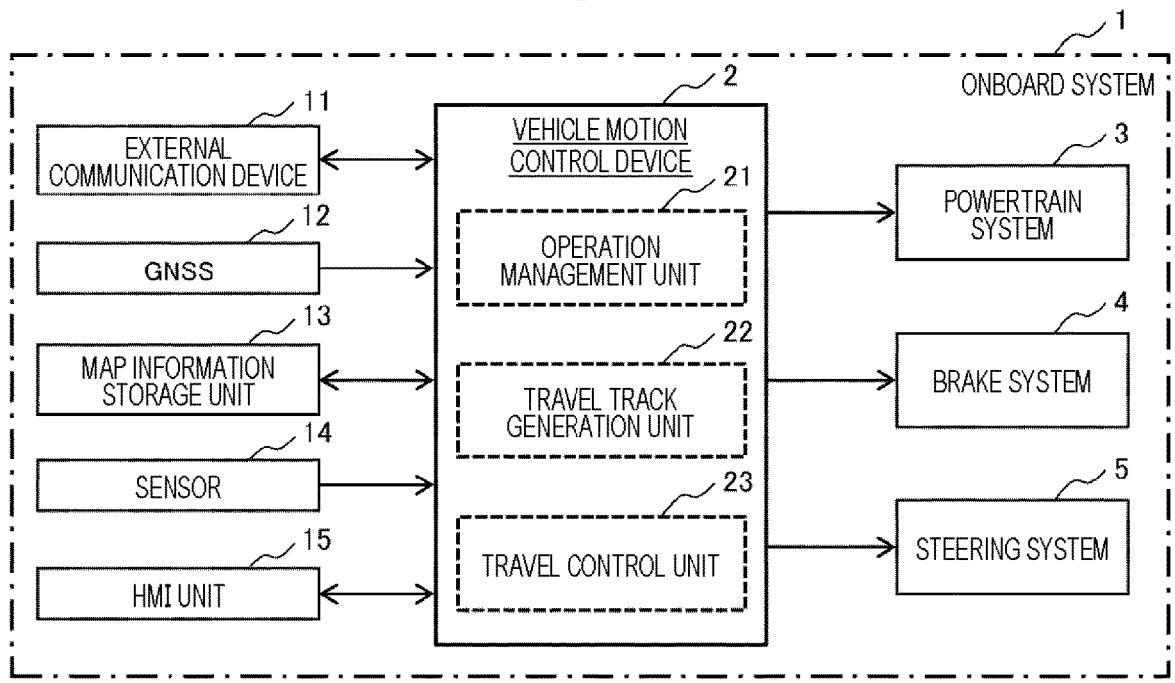
FIG. 1 is an explanatory diagram for explaining a configuration of an onboard system 1 including a vehicle motion control device 2 described in Example 1.

Hereinafter, Examples of the present invention will be described with reference to the drawings. Note that substantially the same or similar configurations are denoted by the same reference numerals, and in a case where descriptions thereof overlap, the description thereof may be omitted.

In addition, the description of a well-known technique may be omitted.

Example 1

<Configuration of Onboard System 1> First, a configuration of an onboard system 1 including a vehicle motion control device 2 described in Example 1 will be described.

FIG. 1 is an explanatory diagram for explaining the configuration of the onboard system 1 including the vehicle motion control device 2 described in Example 1.

The onboard system 1 includes an external communication device 11, a global navigation satellite system (GNSS) 12, a map information storage unit 13, a sensor 14, a human machine interface (HMI) unit 15, the vehicle motion control device 2, a powertrain system 3, a brake system 4, and a steering system 5.

The onboard system 1 is installed in a vehicle and executes vehicle motion control such as automatic driving and driving support of the vehicle.

The external communication device 11 executes inter-vehicle communication with another vehicle or road-to-vehicle communication with a roadside device by wireless communication, and transmits and receives information of the vehicles, a surrounding environment, and the like.

The GNSS 12 receives a radio wave transmitted from an artificial satellite such as a quasi-zenith satellite or a global positioning system (GPS) satellite, and acquires information such as the position of the vehicle (own vehicle).

The map information storage unit 13 stores general road information used in a navigation system or the like, road information including information related to a curve, such as a width of a road and a curvature of a road, information of a road surface condition, a traffic condition, and the like, and information of a vehicle, a surrounding environment, and the like that is information of a traveling state of another vehicle. Note that the information of the vehicle, the surrounding environment, and the like is sequentially updated by information acquired by vehicle-to-vehicle communication or road-to-vehicle communication via the external communication device 11.

The sensor 14 is an external recognition sensor such as an image sensor, a millimeter-wave radar, or a rider that detects information of a vehicle, a surrounding environment, and the like, or a sensor that detects information of an operation by a driver, the speed, acceleration, jerk, and angular velocity of the vehicle, the steering angle of a wheel of the vehicle, and the like.

The information of the vehicle, the surrounding environment, and the like detected by the external recognition sensor is, for example, information of various objects such as an obstacle, a sign, a lane boundary, a lane edge line, a building, a pedestrian, and another vehicle present around the own vehicle. Furthermore, the sensor 14 recognizes, for example, a lane boundary line, a lane edge line, and the like on the basis of a difference between luminance of a white line and a road surface of image data captured by the image sensor.

The HMI unit 15 displays, on a display, information required by a user from information received by an input operation of the user, such as selection of a travel mode or setting of a destination, information acquired by the external communication device 11, the GNSS 12, and the sensor 14, and information recorded in the map information storage unit 13, and provides voice guidance from a speaker. In addition, the HMI unit 15 generates an alarm for calling the user's attention.

Here, the travel mode includes, for example, a comfort mode, an economy mode, a sports mode, and the like, and the travel mode is arbitrarily set by the user, or is set in advance by the user, or is set by an operation management unit 21 to be described later on the basis of travel status information, and the speed, acceleration, jerk, and the like of the vehicle are set. That is, an upper limit value of the behavior of the vehicle changes depending on the travel mode.

In addition, the travel mode includes a shortest time mode for minimizing the travel time, a shortest distance mode for minimizing the travel distance, and the like.

The vehicle motion control device 2 includes the operation management unit 21, a travel track generation unit 22, and a travel control unit 23. The operation management unit 21, the travel track generation unit 22, and the travel control unit 23 are computers that each include hardware such as an arithmetic device such as a central processing unit (CPU), a main storage device and an auxiliary storage device such as semiconductor memories, and a communication device, and perform centralized control on the vehicle. The arithmetic devices execute programs loaded into the main storage devices, thereby implementing various functions.

Note that, in Example 1, for convenience of description, the operation management unit 21, the travel track generation unit 22, and the travel control unit 23 have separate configurations, but do not necessarily have separate configurations, and when these units are used for an actual vehicle, various functions of these units may be enabled by a higher-level controller.

On the basis of the information acquired by the external communication device 11, the GNSS 12, and the sensor 14 and the information recorded in the map information storage unit 13, the operation management unit 21 generates information regarding the behavior of the vehicle such as information of the position of the own vehicle, information (information of the vehicle, the surrounding environment, and the like) of various objects existing around the own vehicle, and information regarding the behavior of the vehicle, such as the lateral acceleration, the yaw rate, and the lateral jerk.

The information regarding the behavior of the vehicle is generated based on information regarding a curve on a route and information of the speed of the vehicle when the vehicle travels on the curve on the route.

In addition, the operation management unit 21 periodically transmits information of the position of the own vehicle, information of various objects, and information regarding the behavior of the vehicle to other vehicles and roadside devices via the external communication device 11, transmits the information to the map information storage unit 13, and sequentially updates the information stored in the map information storage unit 13.

In addition, the operation management unit 21 sets information of a route from the current position of the vehicle to a destination on the basis of the information of the position of the own vehicle, the information of the various objects, the information regarding the behavior of the vehicle, and the information (for example, the travel mode and the destination) received by the HMI unit 15.

Hereinafter, the information generated or set by the motion management unit 21 may be referred to as "travel status information".

The travel track generation unit 22 receives the travel status information and generates a travel track including information such as a travel route (a route to be a travel target when the vehicle travels on a road) to be a travel target of the vehicle and a travel speed (a speed to be a travel target when the vehicle travels on the road).

The travel control unit 23 sets a target driving force, a target braking force, a target steering angle, and the like so that the vehicle travels following the travel track output from the travel track generation unit 22, and controls the powertrain system 3, the brake system 4, and the steering system 5.

The powertrain system 3 controls a driving force generated by an internal combustion engine, an electric motor, or the like on the basis of an operation by a driver or the target driving force output from the travel control unit 23.

The brake system 4 controls a braking force generated by a brake caliper or the like based on an operation by a driver and the target braking force output from the travel control unit 23.

The steering system 5 controls the steering angle of the wheel based on an operation by a driver and the target steering angle output from the travel control unit 23.

<Functional Blocks of Travel Track Generation Unit 22>

Next, functional blocks of the travel track generation unit 22 described in Example 1 will be described.

Figure 2:
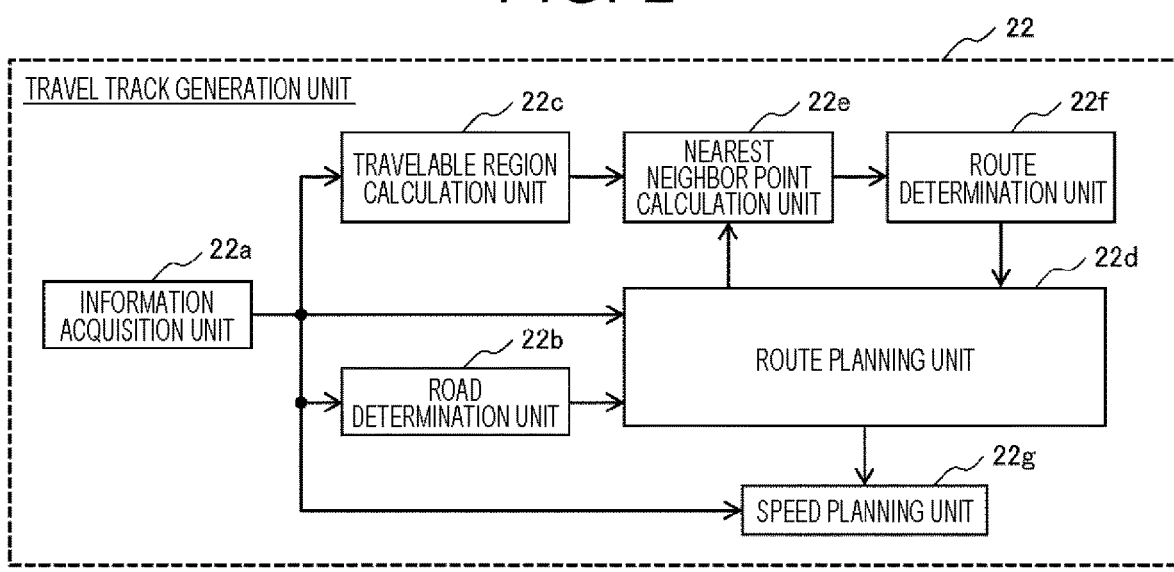
FIG. 2 is an explanatory diagram for explaining functional blocks of a travel track generation unit 22 described in Example 1.

FIG. 2 is an explanatory diagram for explaining the functional blocks of the travel track generation unit 22 described in Example 1.

The travel track generation unit 22 receives the travel status information and generates a travel track including information of a travel route, a travel speed, and the like that are to be travel targets of the vehicle, and includes an information acquisition unit 22a, a road determination unit 22b, a travelable region calculation unit 22c, a route planning unit 22d, a nearest neighbor point calculation unit 22e, a route determination unit 22f, and a speed planning unit 22g.

The information acquisition unit 22a acquires the travel status information from the operation management unit 21 and outputs the travel status information.

The road determination unit 22b receives the travel status information, determines, as one curve, a road shape (curve shape) in which curvatures of a plurality of (two or more) curves on a lane existing in a traveling direction of the vehicle are constant or have a peak or an inflection point, detects the number (information) of curves existing in the traveling direction of the vehicle, and defines (acquires) and outputs information regarding the curves, such as a length, a width, a curvature, a turning direction, a start point, and an end point for each of the detected curves.

Hereinafter, a curvature of one curve that is constant or forms a peak or an inflection point may be referred to as a "peak curvature".

The travelable region calculation unit 22c receives the travel status information and calculates and outputs a travelable region in which the vehicle can travel without coming into contact with an obstacle, a pedestrian, a building, another vehicle, and the like existing in the traveling direction of the vehicle. Note that the travelable region calculation unit 22c may calculate a risk potential map in consideration of the travel range of another vehicle and a reach range regarding the behavior (for example, jumping out onto a road) of a pedestrian and output the risk potential map as the travelable region.

The route planning unit 22d receives the travel status information, information regarding a curve, and a determination result (information), and generates a travel route.

The nearest neighbor point calculation unit 22e receives the travelable region output from the travelable region calculation unit 22c and the travel route output from the route planning unit 22d, searches for each point on the travel route, the nearest neighbor point of each point in the travelable region, and a point opposite the nearest neighbor point of each point in the travelable region, and calculates and outputs the distance between each point and the nearest neighbor point of each point and the distance between each point and the point opposite the nearest neighbor point.

Here, the calculation method in the nearest neighbor point calculation unit 22e will be described.

First, since the travelable region is information having a predetermined width, a plurality of pairs of reference points can be plotted at predetermined intervals on both sides of the travelable region. For example, a plurality of reference points are provided at predetermined intervals on the left side of the travelable region, and a plurality of reference points are provided at predetermined intervals on the right side of the travelable region. That is, the left reference point and the right reference point form a pair.

Next, a nearest reference point (first nearest neighbor point) for a certain point present on the travel route is searched for, and a reference point (second nearest neighbor point) (opposite the first nearest neighbor point) paired with the nearest reference point is searched for.

Here, for convenience of description and for easy understanding, a nearest reference point for a certain point present on the travel route may be referred to as a "nearest neighbor point A", and a reference point paired with the nearest reference point may be referred to as a "nearest neighbor point B".

The nearest neighbor point calculation unit 22e calculates and outputs a distance from a certain point present on the travel route to the nearest neighbor point A, a distance from the certain point to the nearest neighbor point B, and a distance between the nearest neighbor point A and the nearest neighbor point B for each point present on the travel route.

Note that, although it has been described that the travelable region is the information having the predetermined width, there is a possibility that the travelable region does not have a width due to a position of an obstacle, a pedestrian, a building, another vehicle, or the like, a speed of the vehicle, or the like. In this case, the nearest neighbor point calculation unit 22e treats the nearest neighbor point A and the nearest neighbor point B as the same point and calculates the distances.

The route determination unit 22f receives, from the nearest neighbor point calculation unit 22e, the distance from each point present on the travel route to each nearest neighbor point A present on the travel route, the distance from each point present on the travel route to each nearest neighbor point B present on the travel route, and the distance between each nearest neighbor point A and each nearest neighbor point B, determines whether the travel route is within the travelable region, and outputs the determination result (information).

Here, the determination method in the route determination unit 22f will be described.

In order for a certain point present on the travel route to be within the travelable region, the sum of the distance from the certain point present on the travel route to the nearest neighbor point A present on the travel route and the distance from the certain point to the nearest neighbor point B present on the travel route needs to be equal to the distance between the nearest neighbor point A and the nearest neighbor point B.

That is, it is determined that the travel route is within the travelable region when the above-described relationship is established for all points existing on the travel route. It is determined that the travel route is not within the travelable region when the above-described relationship is not established.

The speed planning unit 22g receives the travel status information and the travel route output from the route planning unit 22d, sets the speed (travel speed) at each point present on the travel route, and outputs the travel route as a travel track to the travel control unit 23.

Since the upper limit value of the behavior of the vehicle changes depending on the set travel mode, the speed planning unit 22g sets the travel speed at each point present on the travel route to be equal to or less than the upper limit value of the behavior of the vehicle.

That is, the speed planning unit 22g calculates the behavior of the vehicle generated when the vehicle travels on the travel route, sets the travel speed to be equal to or less than the upper limit value of the behavior of the vehicle set by the travel mode, and generates the travel track.

<Outline of Processing of Route Planning Unit 22d>
Next, an outline of processing of the route planning unit 22d described in Embodiment 1 will be described.

Figure 3:
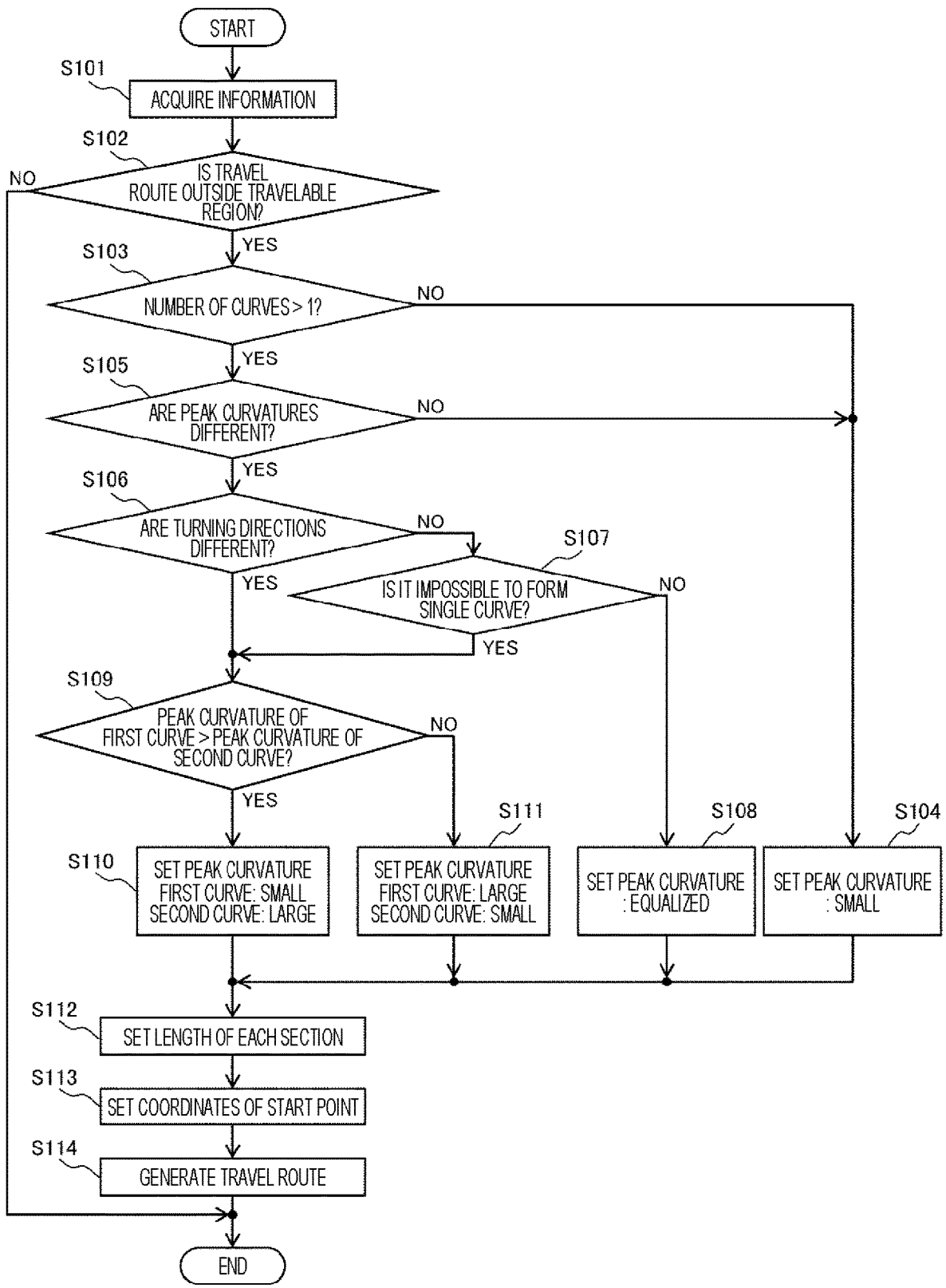
FIG. 3 is a flowchart for explaining an outline of processing of a route planning unit 22*d* described in Example 1.

FIG. 3 is a flowchart for explaining the outline of the processing of the route planning unit 22d described in Example 1.

In Example 1, the number of curves for which a travel route is to be generated is two for convenience of description and easy understanding.

First, in step S101, the travel status information output from the information acquisition unit 22a, the number (information) of curves present in the traveling direction of the vehicle output from the road determination unit 22b, information regarding the curves such as a length, a width, a curvature (peak curvature), a turning direction, a start point, and an end point for each of the detected curves, and the determination result (information) of whether or not the travel route output from the route determination unit 22f is within the travelable region are acquired. Thereafter, the process proceeds to step S102.

Next, in step S102, it is determined whether or not the travel route is outside the travelable region on the basis of the determination result (information) acquired in step S101.

When the travel route is not outside the travelable region (NO), the process ends.

When the travel route is outside the travelable region (YES), the process proceeds to step S103.

Step S102 is a step in a case where the travel route in the travelable region has already been set. When the travel route in the travelable region has not yet been set, step S102 is skipped.

Next, in step S103, it is determined whether or not the number of curves is more than one on the basis of the number (information) of curves existing in the traveling direction of the vehicle acquired in step S101.

When the number of curves is one (NO), the process proceeds to step S104.

When the number of curves is larger than one (YES), the process proceeds to step S105.

In step S104, the peak curvature of the travel route at the time of traveling on the curve is set to a curvature smaller than the peak curvature of the road shape. Thereafter, the process proceeds to step S112.

In step S105, it is determined whether the peak curvatures of the two curves are different based on the information of the peak curvature of each curve existing in the traveling direction of the vehicle acquired in step S101.

Hereinafter, of the two curves, a curve closer to the vehicle may be referred to as a "first curve", and a curve continuously connected to the first curve and farther from the vehicle may be referred to as a "second curve". That is, for example, like an S-shaped curve, the first curve has a section in which the curvature increases and decreases, and the second curve has a section that is adjacent to the first curve and in which the curvature increases and decreases.

When there is no difference between the peak curvature of the first curve and the peak curvature of the second curve (NO), the process proceeds to step S104.

When there is a difference between the peak curvature of the first curve and the peak curvature of the second curve (YES), the process proceeds to step S106.

In step S104, the peak curvature of the travel route at the time of traveling on the first curve and the peak curvature of the travel route at the time of traveling on the second curve (the peak curvature of the travel route at the time of traveling on the first curve=the peak curvature of the travel route at the time of traveling on the second curve) are set to be smaller than the peak curvature of the road shape. Thereafter, the process proceeds to step S112.

In step S106, it is determined whether the turning direction of the first curve is different from the turning direction of the second curve based on the information on the turning directions of the first curve and the second curve existing in the traveling direction of the vehicle acquired in step S101.

When the turning direction of the first curve is not different from (identical to) the turning direction of the second curve (NO), the process proceeds to step S107.

When the turning direction of the first curve is different from (not identical to) the turning direction of the second curve (YES), the process proceeds to step S109.

In step S107, based on the information on the peak curvatures of the first curve and the second curve existing in the traveling direction of the vehicle acquired in step S101, it is determined whether or not the two curves that are the first curve and the second curve cannot be formed into a single curve.

It is determined whether the two curves are formed into the single curve, based on whether the difference between the peak curvature of the first curve and the peak curvature of the second curve is within a predetermined value. That is, when the difference is within the predetermined value, the curves are regarded as one curve, and when the difference is larger than the predetermined value, the curves are not regarded as one curve.

When the single curve can be formed (NO), the process proceeds to step S108.

When the single curve cannot be formed (YES), the process proceeds to step S109.

In step S108, the two curves that the first curve and the second curve are formed into the single curve, and the peak curvature of the first curve and the peak curvature of the second curve are equalized (the peak curvature of the first curve=the peak curvature of the second curve).

Then, the peak curvature of the travel route at the time of traveling on the first curve and the peak curvature of the travel route at the time of traveling on the second curve (the peak curvature of the travel route at the time of traveling on the first curve=the peak curvature of the travel route at the time of traveling on the second curve) are set to be smaller than the peak curvature of the road shape. Thereafter, the process proceeds to step S112.

In the equalization, the peak curvature of the first curve may be set, the peak curvature of the second curve may be set, or the average value of the peak curvature of the first curve and the peak curvature of the second curve may be set.

In step S109, it is determined whether the peak curvature of the first curve is larger than the peak curvature of the second curve based on the information of the peak curvatures of the curves existing in the traveling direction of the vehicle acquired in step S101.

When the peak curvature of the first curve is smaller than the peak curvature of the second curve (NO), the process proceeds to step S111.

When the peak curvature of the first curve is larger than the peak curvature of the second curve (YES), the process proceeds to step S110.

In step S111, the peak curvature of the travel route at the time of traveling on the first curve is set to a curvature larger than the peak curvature of the road shape, and the peak curvature of the travel route at the time of traveling on the second curve is set to a curvature smaller than the peak curvature of the road shape. Thereafter, the process proceeds to step S112.

In step S110, the peak curvature of the travel route at the time of traveling on the first curve is set to a curvature smaller than the peak curvature of the road shape, and the peak curvature of the travel route at the time of traveling on the second curve is set to a curvature larger than the peak curvature of the road shape. Thereafter, the process proceeds to step S112.

Next, in step S112, the lengths of respective sections of a straight line, a transition curve, and a circular curve on the travel route are set based on the information regarding the curve acquired in step S101. Thereafter, the process proceeds to step S113.

In step S113, coordinates of the start point of the first curve are set based on the information regarding the curve acquired in step S101. Thereafter, the process proceeds to step S114.

Next, in step S114, a travel route is generated based on the peak curvature of the travel route at the time of traveling on the curve set in step S104, S108, S111, or S110, the length of each section set in step S112, and the coordinates of the start point of the first curve set in step S113.

When step S102 is skipped, it is determined whether the generated travel route is within the travelable region. When the generated travel route is within the travelable region, the process is ended. When the generated travel route is not within the travelable region, the process returns to step S101.

That is, the route planning unit 22d receives the travel status information output from the information acquisition unit 22a, the number (information) of curves present in the traveling direction of the vehicle output from the road determination unit 22b, the information regarding the curves, such as a length, a width, a curvature (peak curvature), a turning direction, a start point, and an end point for each of the detected curves, and the determination result (information) output from the route determination unit 22f as to whether the travel route is within the travelable region, and generates the travel route present in the travelable region.

As described above, the vehicle motion control device 2 described in Example 1 includes the travel track generation unit 22 that generates, based on information on a curvature of a first curve on a lane existing in a traveling direction of a vehicle and a second curve connected to the first curve, a travel route by setting a curvature of the travel route at a time of traveling on a curve having a smaller curvature between the first curve and the second curve to be larger than the curvature of the curve and setting a curvature of the travel route at a time of traveling on a curve having a larger curvature between the first curve and the second curve to be smaller than the curvature of the curve.

In addition, the vehicle motion control method described in Example 1 causes the travel track generation unit 2 to generate, based on information on a curvature of a first curve on a lane existing in a traveling direction of a vehicle and a curvature of a second curve connected to the first curve, a travel route by setting a curvature of the travel route at a time of traveling on a curve having a smaller curvature between the first curve and the second curve to be larger than the curvature of the curve and setting a curvature of the travel route at a time of traveling on a curve having a larger curvature between the first curve and the second curve to be smaller than the curvature of the curve.

As described above, according to Example 1, even in the case of traveling on a continuous curve (for example, a continuous curve in which a straight line between curves is short or a transition curve is short, a continuous curve in which curves having different magnitudes of curvature are continuous, or the like) in which the distance between a curve and a curve is limited, it is possible to generate a travel route in which the degree of freedom in generating the travel route is large, the behavior of the vehicle traveling on the curve is small, and comfortable ride is achieved.

Note that the small behavior of the vehicle means that the magnitudes (absolute values) of the lateral acceleration, the yaw rate, and the lateral jerk from the zero position are small. In Example 1, in particular, the absolute values of the lateral acceleration, the yaw rate, and the lateral jerk in a curve having a large curvature are smaller than those in a curve having a small curvature. This means that the lateral jerk (absolute value) in the vicinity of the inflection point of the curvature between the curves is small.

In Example 1, the number of curves for which a travel route is to be generated is two for convenience of description and easy understanding.

Hereinafter, a case where the number of curves for which a travel route is to be generated is three or more will be briefly described.

Even when the number of curves is three or more, the road determination unit $22b$ can perform processing according to the flowchart illustrated in FIG. 3, and acquires information (information regarding the number (information) of curves present in the traveling direction of the vehicle, and information regarding the curves, such as a length, a width, a curvature (peak curvature), a turning direction, a start point, and an end point for each of the detected curves) regarding the three or more curves to generate a travel route.

When the number of curves is three or more, the route planning unit $22d$ sets a peak curvature of the travel route at the time of traveling on a curve having the maximum peak curvature to be smaller than the peak curvature of the road shape, sets a peak curvature of the travel route at the time of traveling on a curve having the minimum peak curvature to be larger than the peak curvature of the road shape, and sets a peak curvature of the travel route at the time of traveling on a curve having a peak curvature that is not the maximum and minimum peak curvatures to be smaller than the maximum peak curvature of the road shape and larger than the minimum peak curvature of the road shape to generate the travel route.

A case where a third curve continuously connected to the second curve is newly detected while the vehicle is traveling on the first curve will be briefly described.

Also in this case, the processing can be performed according to the flowchart illustrated in FIG. 3, and the route planning unit $22d$ sets a peak curvature of the travel route at the time of traveling on a curve having a smaller peak curvature between the second curve and the third curve to be larger than the peak curvature of the road shape (curve shape), and sets a peak curvature of the travel route at the time of traveling on a curve having a larger peak curvature between the second curve and the third curve to be smaller than the peak curvature of the road shape (curve shape).

When the turning directions of the second curve and the third curve are different from each other, a travel route with the second curve and the third curve is generated with a point at which the curvature becomes 0 between the first curve and the second curve on the travel route as a start point.

When the turning directions of the second curve and the third curve are the same and the first curve and the second curve are not formed into a single curve, a travel route with the second curve and the third curve is generated with the inflection point of the curvature between the first curve and the second curve on the travel route as a start point.

When the turning directions of the second curve and the third curve are the same, and the first curve and the second curve are formed into a single curve, a travel route is generated by setting the peak curvature of the travel route at the time of traveling on the third curve to be larger than the peak curvature of the road shape with the end point of the single curve on the travel route as a start point.

Here, for example, the setting of the peak curvature of the travel route at the time of traveling on the first curve with the peak curvature (small: $\frac{1}{50}$), the second curve with the peak curvature (medium: $\frac{1}{40}$), and the third curve with the peak curvature (large: $\frac{1}{30}$) will be described.

The peak curvature of the travel route at the time of traveling on the first curve is $\frac{1}{47}$, and the peak curvature of the travel route at the time of traveling on the second curve is $\frac{1}{42}$.

However, when a third curve continuously connected to the second curve is newly detected while the vehicle is traveling on the first curve, the peak curvature of the travel route at the time of traveling on the second curve is changed.

The peak curvature of the travel route at the time of traveling on the second curve is $\frac{1}{38}$, and the peak curvature of the travel route at the time of traveling on the third curve is $\frac{1}{32}$.

As described above, according to Example 1, even in a case where the vehicle travels on three or more continuous curves, it is possible to generate a travel route in which the degree of freedom in generating the travel route is large, the behavior of the vehicle traveling on a curve is small, and comfortable ride is achieved.

<Travel Route in Example 1> Next, a travel route of a first example described in Example 1 will be described.

Figure 4:
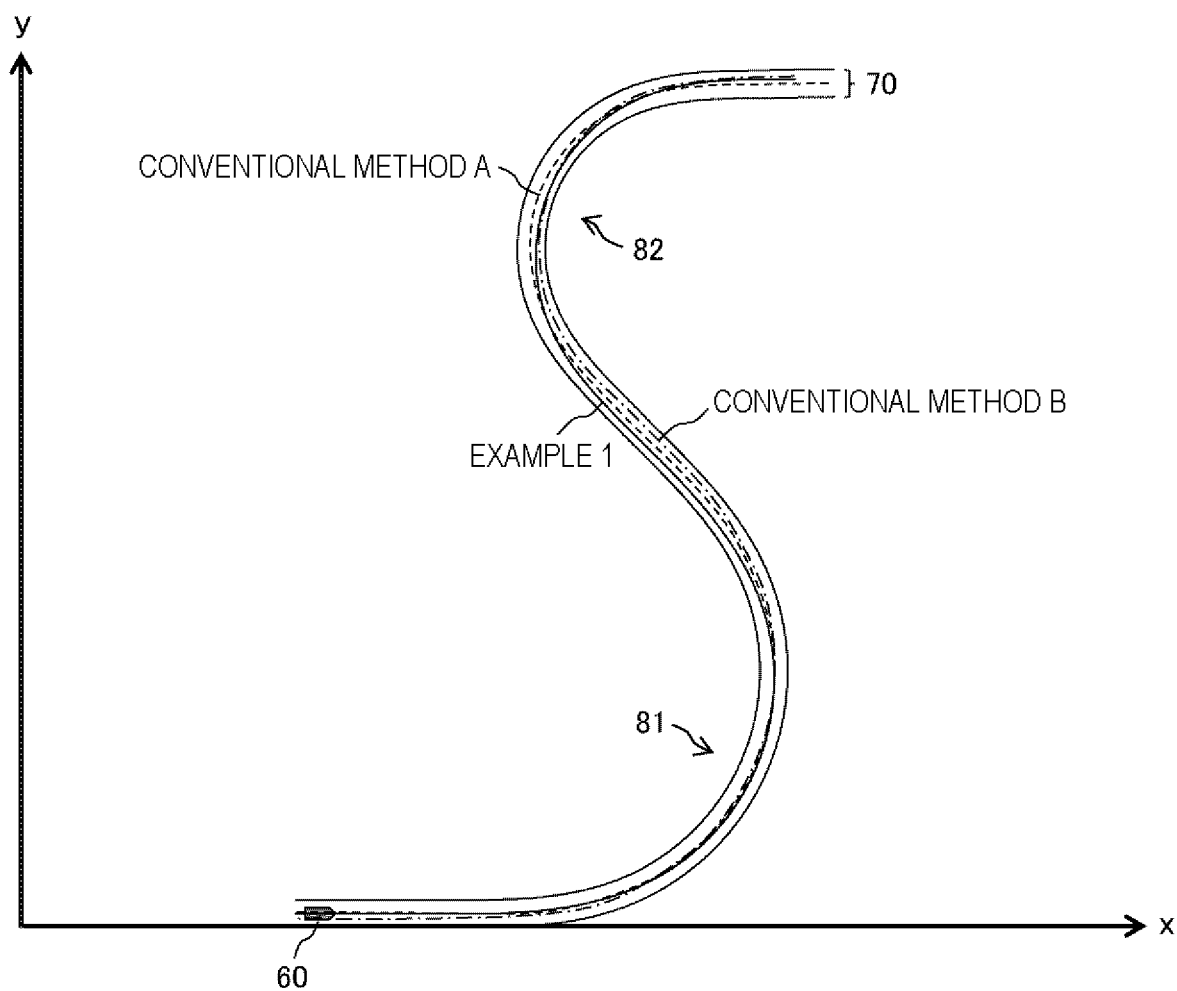
FIG. 4 is an explanatory diagram for explaining a travel route of a first example described in Example 1.

FIG. 4 is an explanatory diagram for explaining the travel route of the first example described in Example 1.

FIG. 4 illustrates a travel route existing in a travelable region 70 when a vehicle 60 on which the onboard system 1 including the vehicle motion control device 2 is mounted travels at a constant speed on a curve (curve in which the peak curvature changes in the middle and the turning direction varies: an S-curve) including a first curve 81 and a second curve 82 having a peak curvature larger than that of the first curve 81.

FIG. 4 illustrates a route for the vehicle 60 to travel in the travelable region 70. In FIG. 4, a broken line indicates a route of the conventional method A in which the vehicle travels in the center of the travelable region 70, an alternate long and short dash line indicates a route of the conventional method B in which the peak curvature of the first curve 81 and the peak curvature of the second curve 82 are smaller than the peak curvature of the road shape, and a solid line indicates a travel route in the case of using Example 1.

That is, in Example 1, in this case, the peak curvature of the travel route at the time of traveling on the first curve 81 is set to a curvature larger than the peak curvature of the road shape, and the peak curvature of the travel route at the time of traveling on the second curve 82 is set to a curvature smaller than the peak curvature of the road shape.

Next, the curvature and the behavior of the vehicle in the case of traveling on the travel route of the first example described in Example 1 will be described.

FIGS. 5A-5D are an explanatory diagram for explaining a curvature and a behavior of the vehicle in the case of traveling on the travel route of the first example described in Example 1.

FIGS. 5A-5D illustrates the curvature and the behavior of the vehicle 60 while the vehicle 60 travels at a constant speed on the curve illustrated in FIG. 4.

Figure 5A:
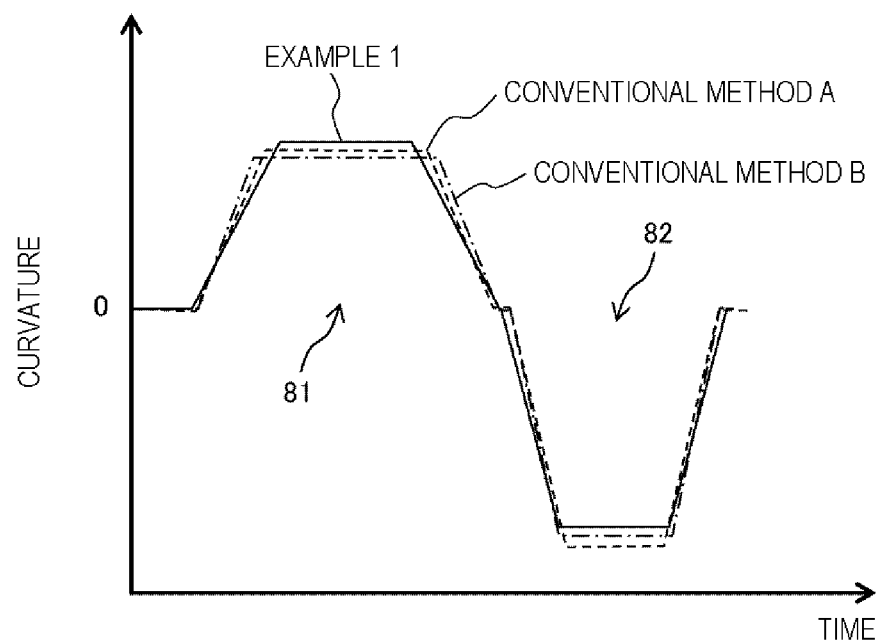
FIG. 5A is an explanatory diagram for explaining a curvature in a case where a vehicle travels on the travel route of the first example described in Example 1.
Figure 5B:
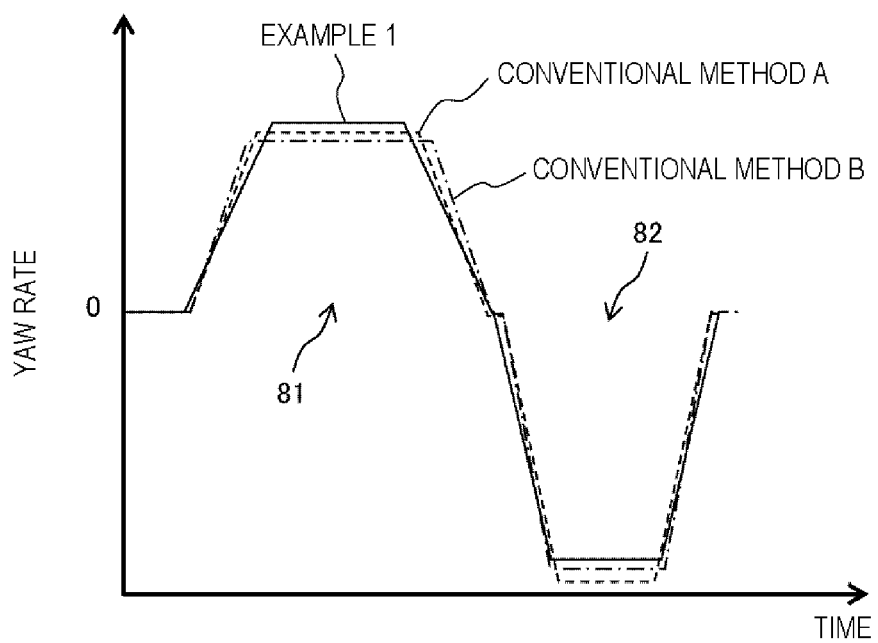
FIG. 5B is an explanatory diagram for explaining a yaw rate in a case where the vehicle travels on the travel route of the first example described in Example 1.
Figure 5C:
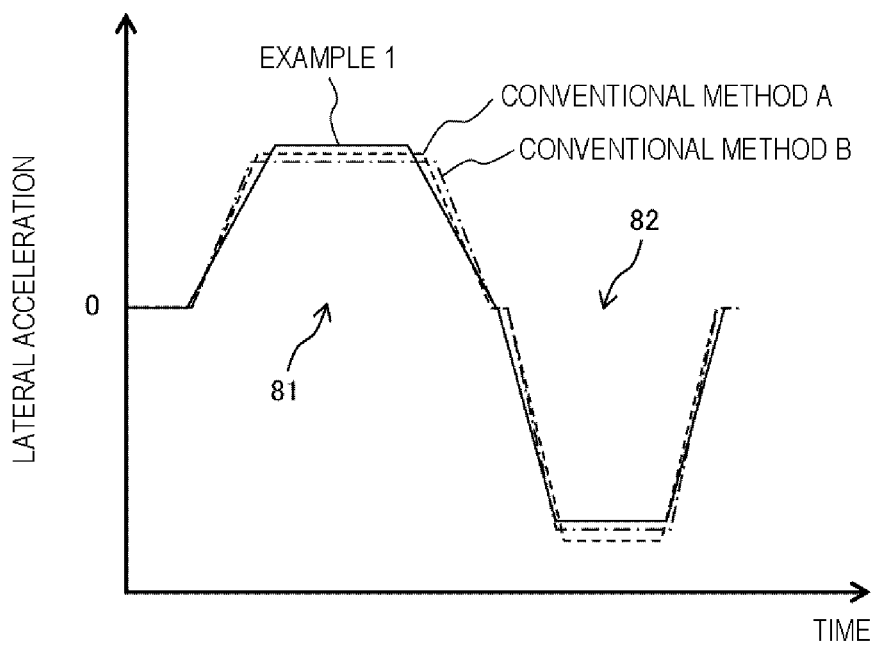
FIG. 5C is an explanatory diagram for explaining lateral acceleration in a case where the vehicle travels on the travel route of the first example described in Example 1.
Figure 5D:
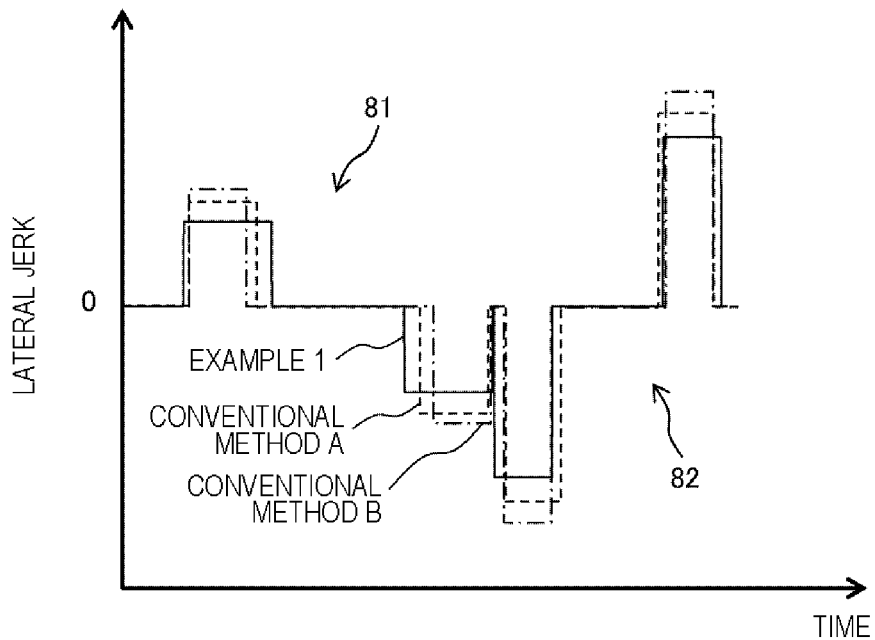
FIG. 5D is an explanatory diagram for explaining lateral jerk in a case where the vehicle travels on the travel route of the first example described in Example 1.

FIG. 5A illustrates a change in the curvature over time, FIG. 5B illustrates a change in the yaw rate over time, FIG. 5C illustrates the lateral acceleration over time, and FIG. 5D illustrates the lateral jerk over time. Broken lines indicate the conventional method A, alternate long and short dash lines indicate the conventional method B, and solid lines indicate Example 1.

As illustrated in FIG. 5A, the peak curvature (the peak curvature of the first curve 81 in Example 1) when the vehicle 60 travels on the first curve 81 in Example 1 is larger than the peak curvature (the peak curvature of the first curve in each of the conventional methods) when the vehicle 60 travels on the first curve 81 in each of the conventional method A and the conventional method B.

Therefore, as illustrated in FIGS. 5B and 5C, in the first curve 81, the yaw rate and the lateral acceleration in Example 1 are larger than those in the conventional method A and the conventional method B.

By making the peak curvature of the first curve 81 in Example 1 larger than the peak curvatures of the first curve 81 in the conventional methods, the degree of freedom of the travel route that can be generated in Example 1 is made larger than those in the conventional method A and the conventional method B.

As a result, the peak curvature (the peak curvature of the second curve 82 in Example 1) when the vehicle 60 travels on the second curve 82 in Example 1 can be made smaller than the peak curvature (the peak curvature of the second curve 82 in each of the conventional methods) when the vehicle 60 travels on the second curve 82 in each of the conventional method A and the conventional method B.

Therefore, as illustrated in FIGS. 5B, 5C, and 5D, in the second curve 82, the absolute values of the yaw rate, the lateral acceleration, and the lateral jerk in Example 1 can be made smaller than those in the conventional method A and the conventional method B.

In Example 1, the decreases in the yaw rate and the lateral acceleration in the second curve 82 can be made larger than the increases in the yaw rate and the lateral acceleration in the first curve 81, as compared with the conventional method A and the conventional method B.

In addition, it is possible to reduce the absolute value of the lateral jerk in the vicinity of the inflection point of the curvature between the first curve 81 and the second curve 82.

As a result, in Example 1, the behavior of the vehicle can be reduced, and the ride comfort can be improved as compared with the conventional method A and the conventional method B.

Next, a travel route of a second example described in Example 1 will be described.

Figure 6:
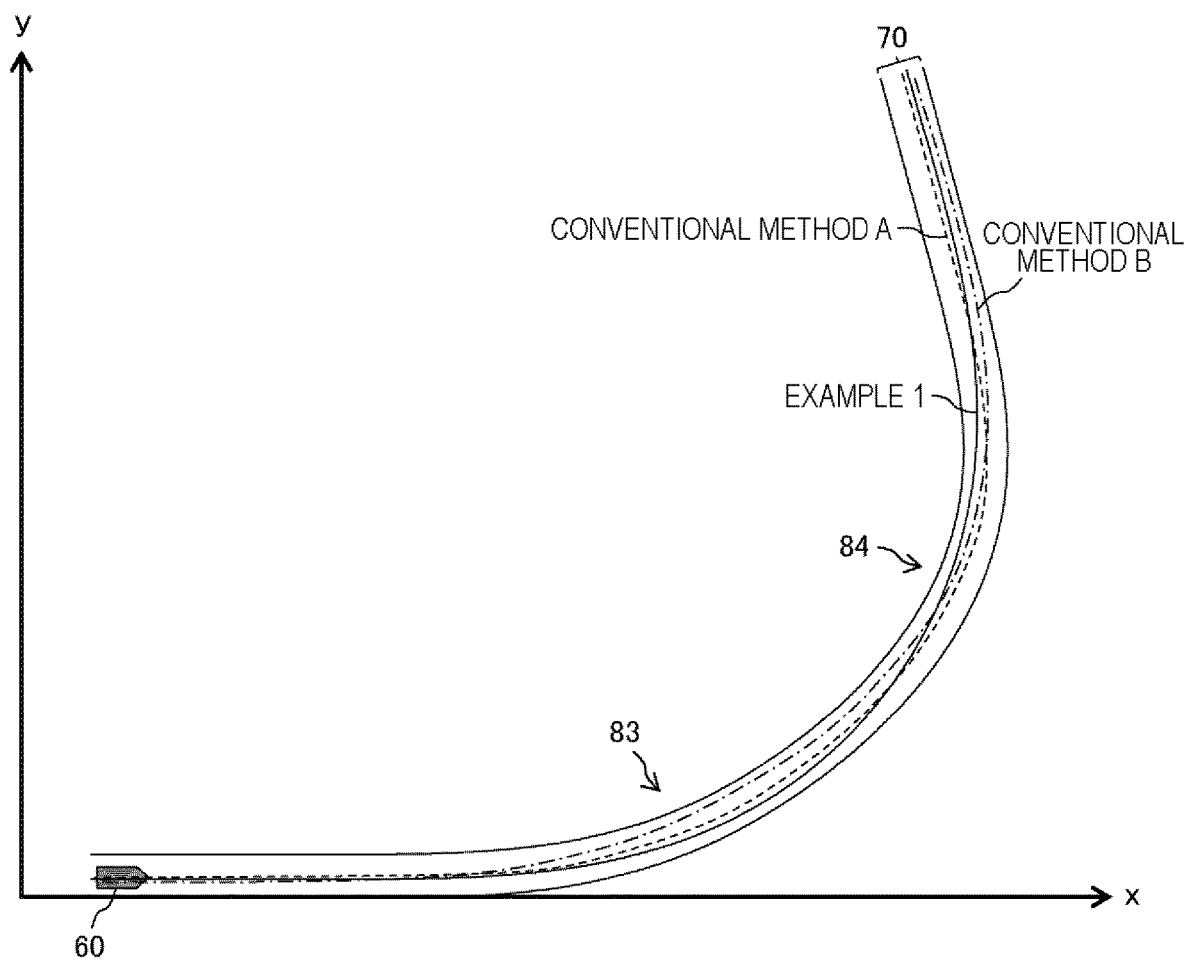
FIG. 6 is an explanatory diagram for explaining a travel route of a second example described in Example 1.

FIG. 6 is an explanatory diagram for explaining the travel route of the second example described in Example 1.

FIG. 6 illustrates the travel route existing in a travelable region 70 when the vehicle 60 on which the onboard system 1 including the vehicle motion control device 2 is mounted travels at a constant speed on a curve (curve in which the peak curvature changes in the middle and the turning direction is the same) including a first curve 83 and a second curve 84 having a peak curvature larger than that of the first curve 83.

FIG. 6 illustrates a route for the vehicle 60 to travel in the travelable region 70. In FIG. 6, a broken line indicates a route of the conventional method A in which the vehicle 60 travels in the center of the travelable region 70, a dashed-dotted line indicates a route of the conventional method B in which the peak curvature of the first curve 83 and the peak curvature of the second curve 84 are smaller than the peak curvature of the road shape, and a solid line indicates a travel route in the case of using Example 1.

That is, in Example 1, in this case, the peak curvature of the travel route at the time of traveling on the first curve 83 is set to a curvature larger than the peak curvature of the road shape, and the peak curvature of the travel route at the time of traveling on the second curve 84 is set to a curvature smaller than the peak curvature of the road shape.

Next, the curvature and the behavior of the vehicle in a case where the vehicle travels on the travel route of the second example described in Example 1 will be described.

FIGS. 7A-7D ARE an explanatory diagram for explaining the curvature and the behavior of the vehicle in a case where the vehicle travels on the travel route of the second example described in Example 1.

FIGS. 7A-7D illustrates the curvature and the behavior of the vehicle 60 traveling at a constant speed on the curve illustrated in FIG. 6.

Figure 7A:
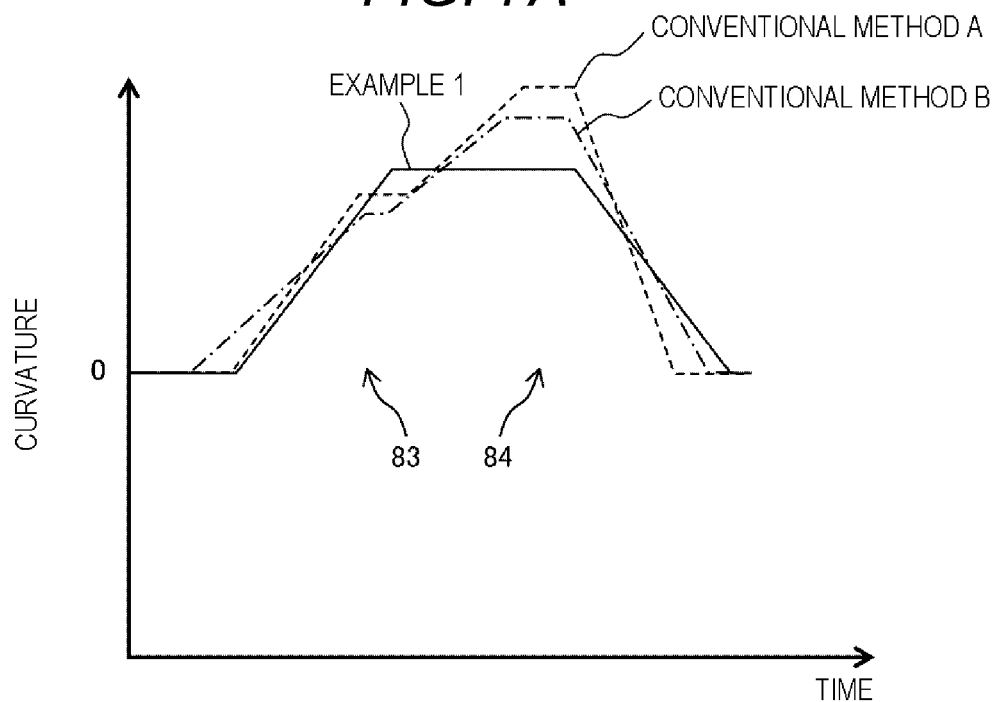
FIG. 7A is an explanatory diagram for explaining a curvature in a case where a vehicle travels on the travel route of the second example described in Example 1.
Figure 7B:
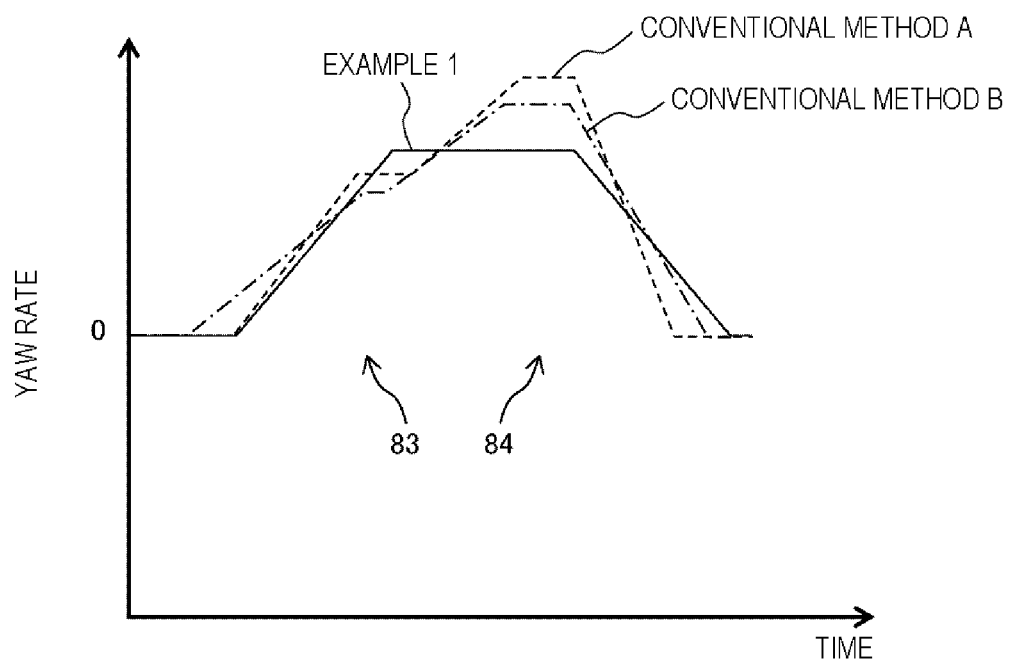
FIG. 7B is an explanatory diagram for explaining a yaw rate in a case where the vehicle travels on the travel route of the second example described in Example 1.
Figure 7C:
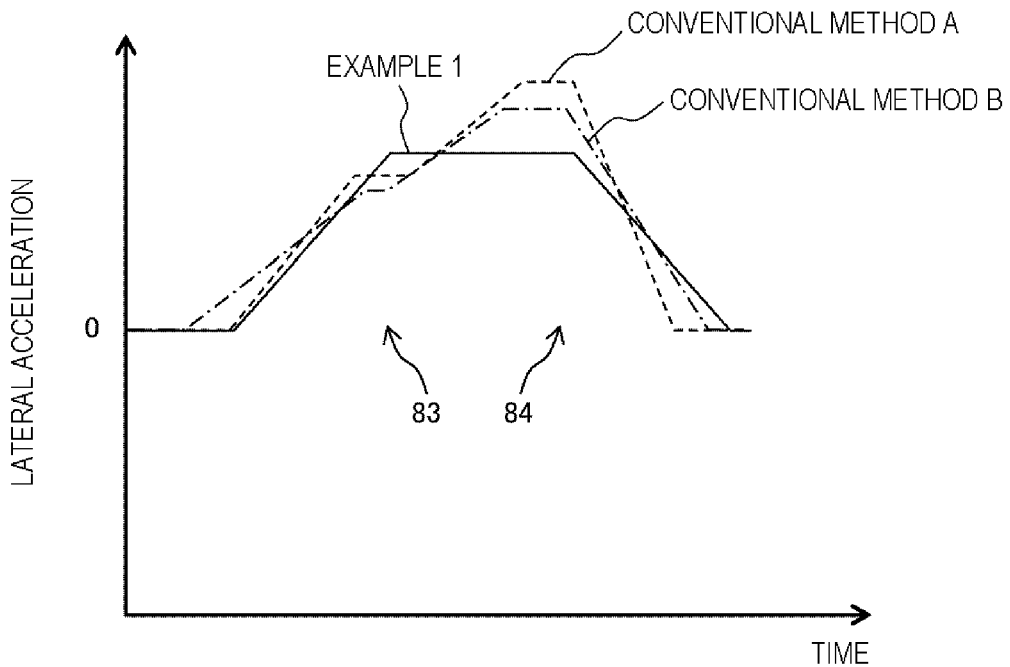
FIG. 7C is an explanatory diagram for explaining lateral acceleration in a case where the vehicle travels on the travel route of the second example described in Example 1.
Figure 7D:
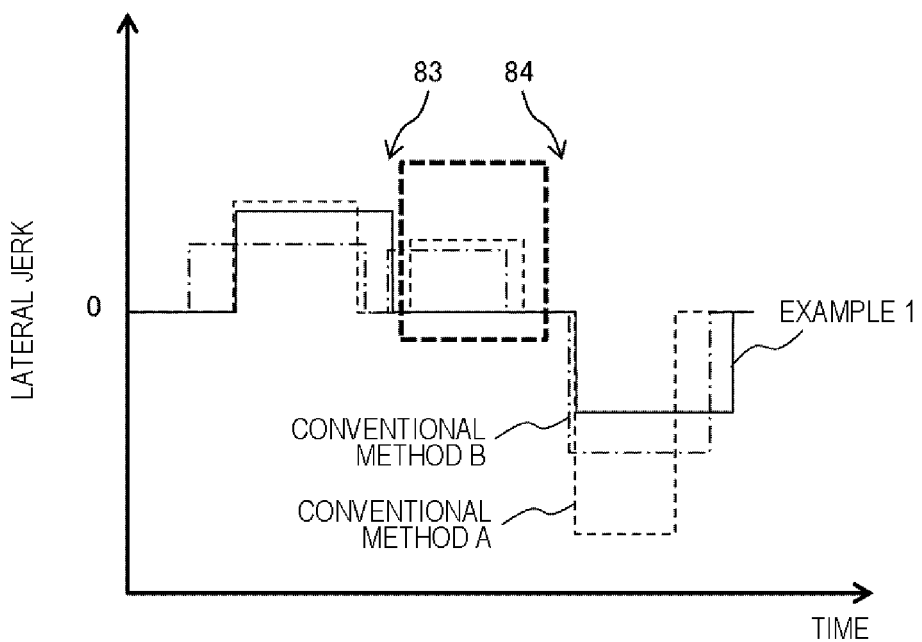
FIG. 7D is an explanatory diagram for explaining lateral jerk in a case where the vehicle travels on the travel route of the second example described in Example 1.

FIG. 7A illustrates a change in the curvature over time, FIG. 7B illustrates a change in the yaw rate over time, FIG. 7C illustrates the lateral acceleration over time, and FIG. 7D illustrates the lateral jerk over time. Broken lines indicate the conventional method A, alternate long and short dash lines indicate the conventional method B, and solid lines indicate Example 1.

In Example 1, as illustrated in FIGS. 7A-7D, for a curve in which the peak curvature changes in the middle and the turning direction is the same, the peak curvature of the travel route at the time of traveling on the first curve 83 having the smaller peak curvature is made larger than the peak curvature of the road shape, and the peak curvature of the travel route at the time of traveling on the second curve 84 having the larger peak curvature is made smaller than the peak curvature of the road shape. Then, the peak curvature of the first curve 83 and the peak curvature of the second curve 84 are set to the same value and the first curve 83 and the second curve 84 are aggregated into one curve having one peak curvature.

As illustrated in FIGS. 7A, 7B, and 7C, the peak curvature (the peak curvature of the curve in Example 1) when the vehicle 60 travels on the curve in Example 1 can be made smaller than the peak curvature (the peak curvature of the curve in each of the conventional methods) when the vehicle 60 travels on the curve in each of the conventional method A and the conventional method B.

Therefore, as illustrated in FIG. 7D, in Example 1, the absolute value of the lateral jerk can also be made smaller than that in the conventional method A and the conventional method B.

In particular, as illustrated in FIG. 7D, the lateral jerk (in the drawing, refer to the inside of a broken line frame) generated between the first curve 83 and the second curve 84 can be made 0.

That is, the absolute value of the lateral jerk in the vicinity of the inflection point of the curvature between the first curve 81 and the second curve 82 can be reduced (to 0).

As a result, in Example 1, the behavior of the vehicle can be reduced, and the ride comfort can be improved as compared with the conventional method A and the conventional method B.

Here, in FIGS. 4 and 6, for example, the setting of the peak curvature of the travel route at the time of traveling on the first curve with the peak curvature (small: $\frac{1}{50}$) and the second curve with the peak curvature (large: $\frac{1}{40}$) will be described. The peak curvature of the travel route at the time of traveling on the first curve is $\frac{1}{47}$, and the peak curvature of the travel route at the time of traveling on the second curve is $\frac{1}{42}$.

FIGS. 5A-5D and 7A-7D illustrate a case where a change in the curvature of the travel route to be generated is linear, but the change in the curvature of the travel route to be generated may be non-linear such as a sine half wavelength diminishing curve or a cubic curve.

As described above, according to Example 1, even in a continuous curve in which a plurality of curves having different magnitudes of curvature are continuous, it is possible to reduce the peak of the curvature in the entire travel route and to achieve comfortable ride with a small vehicle behavior.

Further, according to Example 1, even in a case where the distance between a curve and a curve is limited and the vehicle travels on a continuous curve in which the curvature of the curve changes in the middle, it is possible to generate a travel route in which the behavior of the vehicle traveling on the curve is small and comfortable ride is achieved.

Example 2

<Functional Blocks of Travel Track Generation Unit 22>
Next, functional blocks of a travel track generation unit 22 described in Example 2 will be described.

Figure 8:
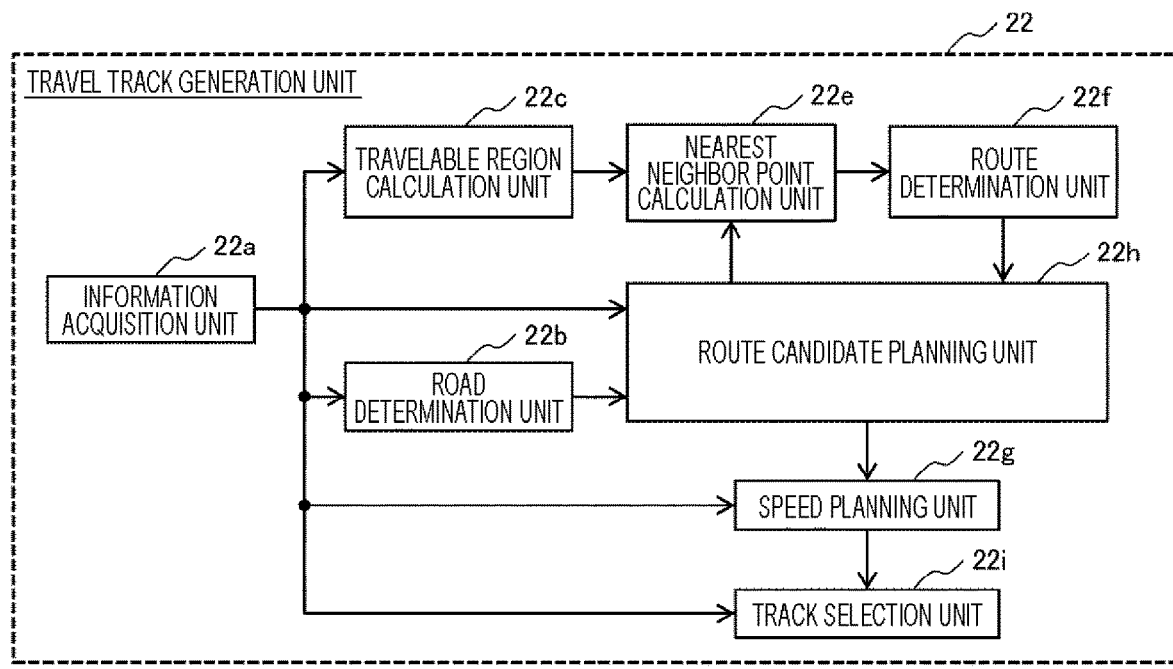
FIG. 8 is an explanatory diagram for explaining functional blocks of a travel track generation unit 22 described in Example 2.

FIG. 8 is an explanatory diagram for explaining the functional blocks of the travel track generation unit 22 described in Example 2.

The travel track generation unit 22 described in Example 2 is different from the travel track generation unit 22 described in Example 1 in that the route planning unit 22d is replaced with a route candidate planning unit 22h and a track selection unit 22i is added.

Note that, here, portions different from those in FIG. 2 will be described, and description of the same portions as those in FIG. 2 will be omitted.

The route candidate planning unit 22h receives travel status information output from the information acquisition unit 22a, the number (information) of curves present in the traveling direction of the vehicle output from the road determination unit 22b, information regarding the curves, such as a length, a width, a curvature (peak curvature), a turning direction, a start point, and an end point for each of the detected curves, and the determination result (information) output from the route determination unit 22f as to whether a travel route is within a travelable region, and generates a plurality of travel routes present in the travelable region.

Note that the plurality of travel routes generated by the route candidate planning unit 22h may have different peak curvatures as well as different lengths of sections and different coordinates of the start point of the first curve.

The speed planning unit 22g receives the travel status information and the plurality of travel routes output from the route candidate planning unit 22h, sets speeds (traveling speeds) at each point present on the plurality of travel routes, and outputs the plurality of travel routes as a plurality of travel tracks to the track selection unit 22i.

The track selection unit 22i receives the travel status information and the plurality of travel tracks output from the speed planning unit 22g, selects one travel track to be a travel target of the vehicle, and outputs the selected travel track as a travel track to the travel control unit 23.

Here, the track selection unit 22i selects a travel track matching the travel mode. The travel mode includes a shortest time mode, a shortest distance mode, and the like. For example, when the shortest time mode is set, a travel track with the shortest travel time is selected from the plurality of travel tracks. When the shortest distance mode is set, a travel track with the shortest travel distance is selected from the plurality of travel tracks.

That is, the track selection unit 22i sets the plurality of travel tracks, selects the travel track with the shortest travel time from the plurality of travel tracks, and selects the travel track with the shortest travel distance from the plurality of travel tracks.

According to Example 2, even in a continuous curve in which a plurality of curves having different magnitudes of curvature are continuous, it is possible to reduce the peak of the curvature in the entire travel route and to achieve comfortable ride with a small vehicle behavior.

Further, according to Example 2, even in a case where the distance between a curve and a curve is limited and the vehicle travels on a continuous curve in which the curvature of the curve changes in the middle, it is possible to generate a travel route in which the behavior of the vehicle traveling on the curve is small and comfortable ride is achieved.

Note that the present invention is not limited to the above-described Examples and includes various modifications. For example, the above-described Examples have been described in detail for easy understanding of the present invention and are not necessarily limited to those with all the described configurations.

Further, a part of the configuration of a certain one of Examples can be replaced with a part of the configuration of the other Example. Further, a configuration of a certain one of Examples can be added to a configuration of the other Example. In addition, a part of the configuration of each Example can be removed, a part of another configuration can be added to a part of the configuration of each Example, and a part of the configuration of each Example can be replaced with a part of another configuration.

The invention claimed is:

1. A vehicle motion control device that improves ride comfort during travel along a curve comprising a plurality of continuous curves having different magnitudes of curvature, the vehicle motion control device comprising:
   a memory;
   a sensor; and
   a processor that is communicatively coupled to the memory and the sensor,
   wherein the processor is configured to:
      receive information on a curvature of a first curve of the plurality of continuous curves on a lane existing in a traveling direction of a vehicle and a curvature of a second curve of the plurality of continuous curves connected to the first curve from the sensor,
      generate a travel route for the curve based on the received information,
      set a curvature of the travel route at a time of traveling on a curve having a smaller curvature between the first curve and the second curve to be larger than the curvature of the curve having a smaller curvature, and
      set a curvature of the travel route at a time of traveling on a curve having a larger curvature between the first curve and the second curve to be smaller than the curvature of the curve having a larger curvature,
   wherein based upon the set curvature of the travel route the vehicle motion control device controls the vehicle motion so as to reduce a peak of a curvature and increase a degree of freedom of the travel route.

2. The vehicle motion control device according to claim 1, wherein
   the processor determines, as one curve, a curve in which curvatures of a plurality of curves on a lane existing in a traveling direction of a vehicle are constant or a curve having a peak or an inflection point.

3. The vehicle motion control device according to claim 1, wherein
when a turning direction of the first curve and a turning direction of the second curve are the same,
the processor determines whether or not the first curve and the second curve can be formed into a single curve, and
when a single curve can be formed, the processor forms the first curve and the second curve into a single curve and equalizes the curvature of the first curve and the curvature of the second curve.

4. The vehicle motion control device according to claim 1, wherein
when three or more curves exist, the processor acquires information regarding the three or more curves and generates a travel route.

5. The vehicle motion control device according to claim 4, wherein
when three or more curves exist and the processor newly detects a third curve connected to the second curve in a state in which the vehicle travels on the first curve,
the processor generates a travel route by setting a curvature of the travel route at a time of traveling on a curve having a smaller curvature between the second curve and the third curve to be larger than the curvature of the curve having a smaller curvature and setting a curvature of the travel route at a time of traveling on a curve having a larger curvature between the second curve and the third curve to be smaller than the curvature of the curve having a larger curvature.

6. The vehicle motion control device according to claim 1, wherein
the processor sets a travel speed to be equal to or less than an upper limit value of a behavior of a vehicle.

7. The vehicle motion control device according to claim 6, wherein
the processor sets a plurality of travel tracks and selects a travel track with a shortest travel time from the plurality of travel tracks.

8. The vehicle motion control device according to claim 6, wherein
the processor sets a plurality of travel tracks and selects a travel track with a shortest travel distance from the plurality of travel tracks.

9. A vehicle motion control method that improves ride comfort during travel along a curve comprising a plurality of continuous curves having different magnitudes of curvature, the method comprising:
receiving information on a curvature of a first curve of the plurality of continuous curves on a lane existing in a traveling direction of a vehicle and a curvature of a second curve of the plurality of continuous curves connected to the first curve,
generating a travel route for the curve based on the received information,
setting a curvature of the travel route at a time of traveling on a curve having a smaller curvature between the first curve and the second curve to be larger than the curvature of the curve having a smaller curvature, and
setting a curvature of the travel route at a time of traveling on a curve having a larger curvature between the first curve and the second curve to be smaller than the curvature of the curve having a larger curvature,
wherein based upon the set curvature of the travel route the vehicle motion control device controls the vehicle motion so as to reduce a peak of a curvature and increase a degree of freedom of the travel route.

10. The vehicle motion control method according to claim 9, wherein
the processor determines whether or not the first curve and the second curve can be formed into a single curve when a turning direction of the first curve and a turning direction of the second curve are the same, and
when a single curve can be formed, the processor forms the first curve and the second curve into a single curve and equalizes the curvature of the first curve and the curvature of the second curve.

11. The vehicle motion control method according to claim 9, wherein
when three or more curves exist, the processor acquires information regarding the three or more curves and generates a travel route.

12. The vehicle motion control method according to claim 11, wherein
when three or more curves exist and the processor newly detects a third curve connected to the second curve in a state in which the vehicle travels on the first curve,
the processor generates a travel route by setting a curvature of the travel route at a time of traveling on a curve having a smaller curvature between the second curve and the third curve to be larger than the curvature of the curve having a smaller curvature and setting a curvature of the travel route at a time of traveling on a curve having a larger curvature between the second curve and the third curve to be smaller than the curvature of the curve having a larger curvature.

13. The vehicle motion control method according to claim 9, wherein
the processor sets a travel speed to be equal to or less than an upper limit value of a behavior of a vehicle.

14. The vehicle motion control method according to claim 13, wherein
the processor sets a plurality of travel tracks and selects a travel track with a shortest travel time from the plurality of travel tracks.

15. The vehicle motion control method according to claim 13, wherein
the processor sets a plurality of travel tracks and selects a travel track with a shortest travel distance time from the plurality of travel tracks.

* * * * *